(12) United States Patent
Donaldson (10) Patent No.: US 8,147,797 B2
(45) Date of Patent: Apr. 3, 2012

(54) METHOD AND SYSTEM FOR HEATING AND COOLING SLURRIES

(75) Inventor: Donald J. Donaldson, Medford, OR (US)

(73) Assignee: Donald J. Donaldson, Medford, OR (US)

( * ) Notice: Subject to any disclaimer, the term of this patent is extended or adjusted under 35 U.S.C. 154(b) by 1182 days.

(21) Appl. No.: 10/940,893

(22) Filed: Sep. 13, 2004

(65) Prior Publication Data

US 2005/0077032 A1 Apr. 14, 2005

Related U.S. Application Data

(60) Provisional application No. 60/511,270, filed on Oct. 14, 2003.

(51) Int. Cl.
*F28D 15/00* (2006.01)

(52) U.S. Cl. ............ 423/659; 423/27; 423/41; 423/109; 423/141; 423/150.1; 165/143; 165/154; 165/157; 165/158; 266/168; 266/171; 266/176; 266/177; 422/608; 422/614; 422/615; 422/620; 422/621; 75/710

(58) Field of Classification Search ............... 423/150.1, 423/141, 27, 41, 109, 659; 165/143, 154, 165/157, 158; 266/168, 171, 176, 177; 422/608, 422/614, 615, 620, 621; 75/710–745
See application file for complete search history.

(56) References Cited

U.S. PATENT DOCUMENTS

| | | | | |
|---|---|---|---|---|
| 2,841,679 A | * | 7/1958 | Yamazaki | 219/628 |
| 2,946,658 A | * | 7/1960 | Donaldson | 423/121 |
| 3,018,170 A | * | 1/1962 | Soloducha | 422/613 |
| 3,497,317 A | | 2/1970 | Tusche | |
| 3,965,239 A | | 6/1976 | Posel | |
| 4,044,096 A | * | 8/1977 | Queneau et al. | 423/150.4 |
| 4,098,870 A | * | 7/1978 | Fekete et al. | 423/124 |
| 4,112,047 A | | 9/1978 | Donaldson | |
| 4,304,527 A | | 12/1981 | Jewell et al. | |
| 4,399,109 A | * | 8/1983 | Iler et al. | 423/141 |
| 4,415,542 A | * | 11/1983 | Queneau et al. | 423/141 |
| 4,460,318 A | | 7/1984 | Horton | |
| 4,472,359 A | * | 9/1984 | Pietsch et al. | 423/20 |
| 4,547,132 A | | 10/1985 | Uchida et al. | |
| 4,738,718 A | * | 4/1988 | Bakshani et al. | 423/29 |

(Continued)

OTHER PUBLICATIONS

I. G. Bowen, "The Lock Hopper Slurry Pump", Annual Meeting of the American Institute of Mining, Metallurgical, and Petroleum Engineers, Inc., Chicago, Illinois, Feb. 14-18, 1965.

(Continued)

*Primary Examiner* — Steven Bos
(74) *Attorney, Agent, or Firm* — Schwabe, Williamson & Wyatt, P.C.

(57) ABSTRACT

A system for cooling and recuperative heating of a slurry in a metallurgical process which includes heat exchangers, pumps and autoclaves is described herein. The heat exchangers use a non-scaling common liquid heat transfer medium. Preferably, the heat exchangers are tube-in-tube heat exchangers with 3 to 7 slurry tubes in each heat exchanger. An advantage of this system is that it does not use flash tanks. To minimize abrasive wear on impinged surfaces, the velocity of the slurry is not more than 5 meters per second. The slurry comprises a solids concentration of 25% to 50%. Preferably, the pumps in the system are float-type pumps in which the driven liquid from the discharge pumps is also used as the drive liquid for the feed pumps.

17 Claims, 4 Drawing Sheets

U.S. PATENT DOCUMENTS

| | | | |
|---|---|---|---|
| 5,027,891 | A | 7/1991 | Fulford et al. |
| 6,012,514 | A * | 1/2000 | Swain ............................ 165/154 |
| 6,379,637 | B1 | 4/2002 | Curlook |
| 2003/0223928 | A1 * | 12/2003 | Freeman et al. .............. 423/145 |

OTHER PUBLICATIONS

R. R. Moskalyk and A. M. Alfantazi, "Nickel laterite processing and electrowinning practice", Minerals Engineering, vol. 15: pp. 593-605 (2002).

F. Orbán et al., "Processing of Monohydrate Bauxites by Tube Digestion", Light Metals 1989, The Minerals, Metals & Materials Society (1988).

T. Yamaguchi et al., "Investigation of Hydrohoist for Pumping Bauxite Slurry", Hitachi Review, vol. 19(5): pp. 185-190 (1969).

Moskalyk, R.R., and Alfantazi A.M. "Nickel Laterite Processing and Electrowinning Practice" Minerals Engineering, vol. 15, Issue 8, Aug. 2002, pp. 593-605.

Dalvi, Ashok D. et al. "The Past and the Future of Nickel Laterites" The Minerals, Metals & Materials Society 133rd Annual Meeting & Exhibition, Charlotte, NC, Mar. 14-18, 2004.

Krause, E. et al. "Sulfuric Acid Leaching of Nickeliferous Laterites" INCO Limited and University of Toronto, Ont. Canada.

Campbell, F. et al. "The Scale-up and Design of Pressure Hydromatallurgical Process Plants" Journal of Metals, Sep. 1999.

Sist, C. and Demopoulas, George P. "Nickel Hydroxide Precipitation from Aqueous Sulfate Media" Journal of Metals, Aug. 2003.

Mihaylov, I., Krause, E.,Okita, Y., Duterque, L.P., and Perraud, J.-J. "The development of a novel hydrometallurgical process for nickel and cobalt recovery from Goro latrite ore" CIM Bulletin, vol. 93, No. 1041.

Blakey, B,C., James, D.F., Kawaji, M., and Krause, E. "The Viscous Behavior of Aqueous Solutions of Goethite and Limonitic Laterites Characterization for Design and Analysis of Tubular Transport and Heating Systems" EPD Congress 2000, The Minerals, Metals & Materials Society, 2000.

Lunt, D., Anderson, P., Briggs, N. "Ramp-up of the Western Australia Nickel Laterite Projects" GRD Minproc Limited. TMS 2004, Charlotte, NC, Mar. 15-18, 2004.

Whittington, B.I. "Characterization of Scales Obtained during Continuous Nickel Laterite Pilotplant Leaching" Metallurgical and Materials Transaction B, vol. 31B, Issue 6, Dec. 2000, pp. 1175-1186.

Bacon, G. "Nickel Outlook and Production Processes" The Minerals, Metals & Materials Society Annual Meeting Annual Meeting & Exhibition, San Diego, Mar. 2-6, 2003.

"World Nickel Congress," CDI 2002. Cobalt News, 2002. Published by the Cobalt Development Institute (CDI), January, pp. 3-6.

Yamaguchi, Takashi et al. "Investigation of Hydrohoist for Pumping Bauxite Slurry," Hitachi Review, vol. 19, No. 5.

Takenaka, Y. et al., "Development of Bauxite Slurry Feed in High Pressure Digestion Process," TMS_Alumina and Bauxite Annual Meeting.

Mihaylov, Indje, "Solvent Extractants for Nickel and Cobalt: New Opportunities in Aqueous Processing," Journal of Metals, Jul. 2003, pp. 38-42.

Klein, B., "Modifying the rheology of nickel laterite suspensions," Minerals Engineering, vol. 15, Issue 10, Oct. 2002, pp. 745-749.

Muriyama, K. et al., "Recent Improvement of Reduction Rotary Kiln Operations at Hyuga Smelting Co., Ltd." International Laterite Nickel Symposium 2004, pp. 733-741.

* cited by examiner

METHOD AND SYSTEM FOR HEATING AND COOLING SLURRIES

CROSS-REFERENCE TO RELATED APPLICATION

This application is a continuation-in-part of U.S. provisional patent application Ser. No. 60/511,270, filed on Oct. 14, 2003. The priority of the prior application is expressly claimed and its disclosure is hereby incorporated by reference in its entirety.

BACKGROUND OF THE INVENTION

1. Technical Field

The present invention relates generally to an improved method for treating a process fluid. More specifically, the present invention relates to an improved method for heating and cooling a slurry.

2. Field of the Invention

There are several hydrometallurgical processes that require a slurry to be heated to elevated temperature to cause a reaction or transformation to occur and subsequently be cooled to atmospheric conditions for further processing. Examples of such hydrometallurgical processes include recovery of nickel from nickel laterite ore, recovery of gold from refractory gold ore, and recovery of zinc from zinc concentrates. The process for recovery of nickel from laterite ore by leaching with sulfuric acid is called Pressure Acid Leach or PAL. The PAL process requires large volumes of thick abrasive slurry to be raised to elevated temperature, (about 240° C. or higher) and, consequently, to elevated pressures (about 50 atm). PAL process facilities typically have serious operating, maintenance, and reliability problems. Most of the problems can be attributed to the use of multiple pumping stations to raise the slurry to autoclave pressure, large amounts of flash and live injection steam to heat the slurry to or near autoclave temperature, and several steps of flash cooling to lower the temperature and pressure of the slurry down to atmospheric conditions.

The conventional facility for heating a slurry to elevated autoclave or reactor temperature and then cooling the slurry to atmospheric pressure conditions is composed of flash tanks (cooling) and heat exchangers (heating) to recover heat from the flash steam. The design of the recuperative heat exchangers may be by direct injection of flash steam, by shell and tube, or by some combination of the two types.

Figure 1:
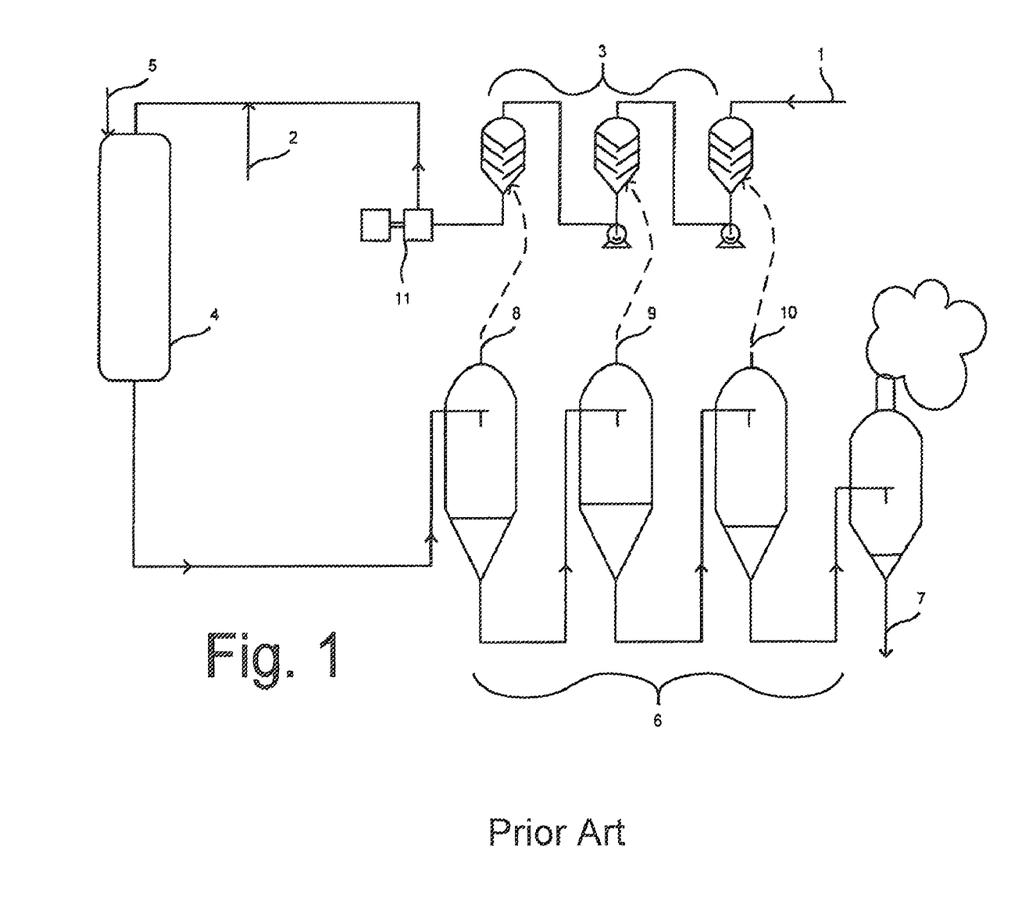
FIG. 1 is a flow diagram of a conventional PAL facility.

An example of the heat exchange systems used in design of conventional PAL facilities is shown in FIG. 1. An aqueous nickel ore slurry 1 is 25% to 50% by weight solids with or without the addition of sulfuric acid 2. The slurry 1 is at a temperature of less than 100° C. and is introduced into a series of heat exchangers 3 to preheat the slurry prior to leaching nickel from the ore in an autoclave 4 or a series of autoclaves. There is a pump 11 between the heat exchangers 3 and the autoclave 4. The heat exchangers 3 may be direct or indirect or a combination. Live steam 5 is used directly or indirectly to heat the slurry from the heat exchangers 3 to a temperature of 240° C. to 280° C. Sulfuric acid 2 may be added to the autoclave. The acidic nickel ore slurry is held in the autoclave 4 at temperature for about 20 minutes to 2 hours to cause about 95% of the nickel content of the ore (about 1% to 3% by weight) to go into solution. The treated slurry from the autoclave 4 enters a series of flash tanks 6 where the slurry is flash cooled to reduce the slurry temperature to its atmospheric boiling temperature at the discharge 7. The streams 8 to 10 from each flash tank 6, at succeeding lower temperature and pressure, are used to preheat the nickel ore slurry in the heat exchangers 3.

There are several problems with the flash cooling and recuperative heating process of FIG. 1. One problem is that the use of flash steam for injection steam heating requires a pump and pressure control facility at each stage of heating. The difficulties of pressure control, slurry level control and maintenance make this a troublesome means of recuperative heat exchange. In addition, injected flash steam increases the weight of slurry flowing, thereby increasing the amount of live steam needed to raise the slurry to autoclave or reactor temperature and the amount of excess flash steam (blow-off steam) wasted to the atmosphere.

Another problem is that the use of flash steam for indirect heating usually results in deposits on the heat exchange surface because of entrainment of slurry in the flash steam. This fouling lowers the overall heat transfer coefficient and the efficiency of the heat recovery. In addition, scale or deposits on the shell side of heat exchangers are difficult to clean and may not be completely removed on cleaning.

Yet another problem is that flash cooling from elevated temperatures requires several stages of depressurizing flash tanks to cool the slurry. High velocities (10 m/sec. and higher) occur in depressurizing a superheated slurry, resulting in severe abrasive wear of piping, level control valves and of other impinged surfaces.

An alternative to flash cooling would be to use counter-current heat exchangers to heat and cool the slurry. In this case, either the hot or cold slurry would be on the shell side of the heat exchanger, resulting in the problem of partly plugging by "sanding" (depositing larger particles) and/or scale deposits. Again, the problems are of loss of efficiency of heat transfer, difficulty in cleaning the shell side, and poor availability of the heat exchanger.

BRIEF SUMMARY OF THE INVENTION

Operating and reliability problems of facilities as encountered with the typical elevated temperature hydrometallurgical process facility can be mitigated by using a different approach to heating and cooling the slurry.

It is proposed that operating and reliability problems of hydrometallurgical process facilities, such as those used in the PAL process, can be mitigated by using tube-in-tube heat exchangers and "float type" positive displacement pumps. Described herein is an innovative application of such equipment in the facility design of the PAL process. The application described herein could also be utilized in other hydrometallurgical processes, such as recovery of gold from refractory gold ore, and recovery of zinc from zinc concentrates The improved method proposed comprises two parts: 1) Slurry Heating and Cooling and 2) Slurry Pumping.

BRIEF DESCRIPTION OF THE DRAWINGS

The nature, principle and utility of the present invention will be clearly understood from the following detailed description when read in conjunction with the accompanying drawings, wherein.

The drawings are for illustrative purposes only and are not drawn to scale. In the drawings, the same numbers are used for the same part or portion throughout the drawings.

DETAILED DESCRIPTION OF THE INVENTION

1) Slurry Heating and Cooling

Figure 2:
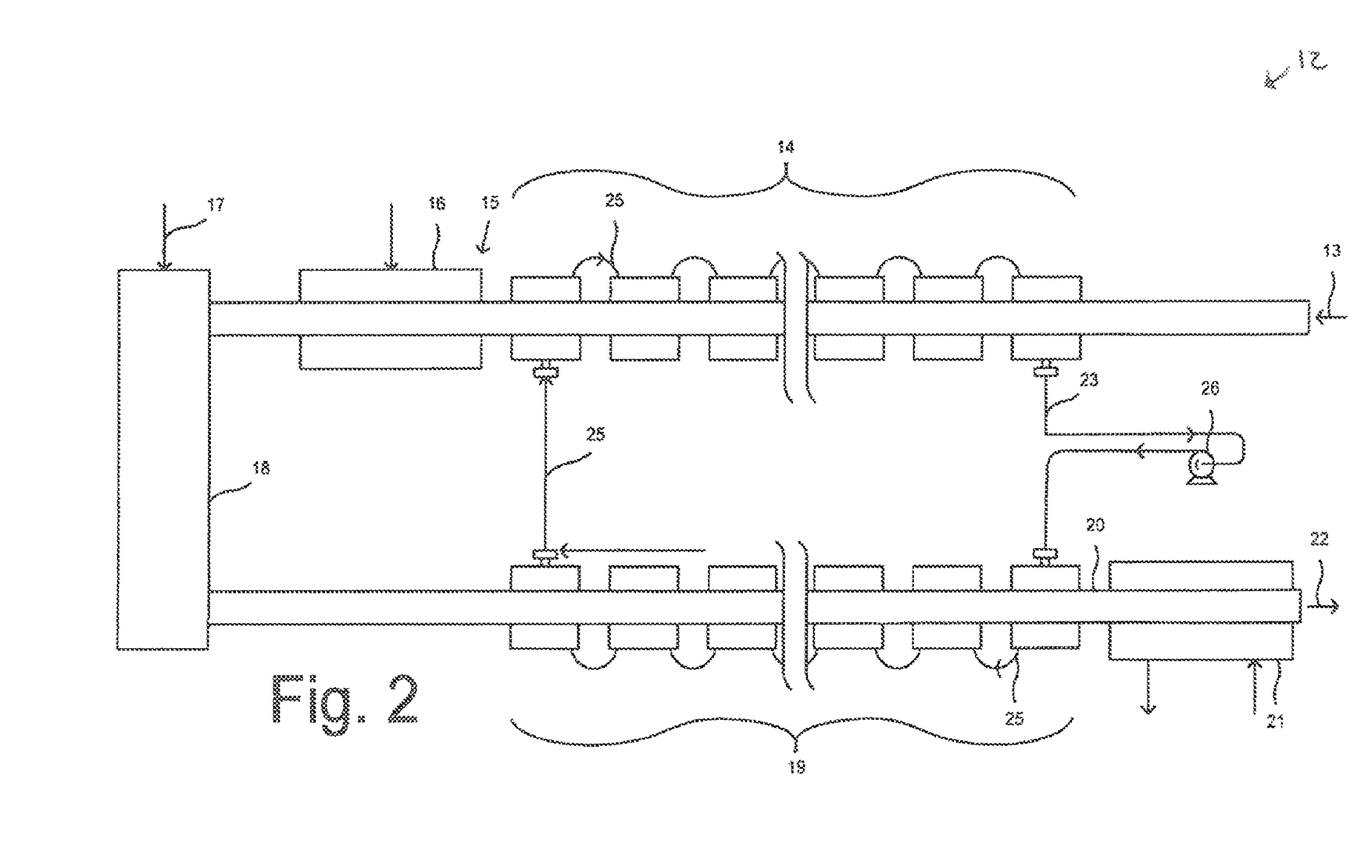
FIG. 2 is a flow diagram of the slurry heating and cooling process of the present invention.

An example of this improved method of heating a slurry 13 having abrasive properties to and cooling from elevated temperatures and pressures is shown in FIG. 2. Specifically, FIG. 2 shows a heat exchange system 12 for carrying out the improved heating and cooling method. This improved heating and cooling method could be used in any hydrometallurgical process, such as a PAL process, recovery of gold from refractory gold ore, or recovery of zinc from zinc concentrates.

In this example, slurry 13 includes nickel ore and is raised to the elevated temperature of 275° C. in the autoclave 18. Initially, slurry 13 at 75° C. enters the tube side of a series of slurry heat exchangers 14 where the temperature of slurry 13 is raised to about 235° C. at the exit 15 by a counter current flow of a heat exchange medium 25 (also referred to as a heat transfer medium 25). A live steam heat exchanger 16 and the addition of sulfuric acid 17, if added, raises the temperature of slurry 13 to about 275° C. in the autoclave 18.

After the autoclave 18, slurry 13 enters the tube side of a series of slurry cooling exchangers 19 where the temperature of slurry 13 is lowered to about 11 5° C. at the exit 20 by the counter current flow of the heat exchange medium 25. The superheated slurry from the slurry cooling exchangers 19 enters the tube side of a cooling water heat exchanger 21 where the slurry temperature is further lowered to 100° C. or lower at exit 22, that is, to a temperature below atmospheric boiling temperature.

The heat transfer medium 25, which has been cooled to about 95° C., discharges from the slurry heating exchangers 14 at exit 23 and is circulated through the shell side of the slurry cooling exchangers 19 and the slurry heating exchangers 14 by the circulating pump 26. A small auxiliary pump and system (not shown) may be employed to assure that the pressure of the heat transfer medium 25 is kept above boiling pressure at the discharge from the slurry cooling exchangers 19.

The flow rate of the heat transfer medium 25 must be controlled close to the optimum rate to achieve the best efficiency of heat recovery. A higher than optimum flow rate would not heat the heat transfer medium to the highest possible temperature, resulting in slurry 13 not being heated to the highest possible temperature. A lower than optimum flow rate would not heat slurry 13 to the highest possible temperature because of an overall lower than optimum heat rate in the heat transfer medium.

The improved method employs tube heat exchangers in a unique application to heat and cool abrasive slurries without using a series of flash depressurizing steps or using direct counter-current heat exchange with slurry on the shell side. A clean, non-scaling heat transfer medium, such as water or other liquid for example, is used on the shell side of the heat exchangers 14 and 19 so that there will be no scaling or deposition on shell side surfaces. The heat transfer medium 25 is common to both the heating exchangers 14 and the cooling exchangers 19.

Figure 4:
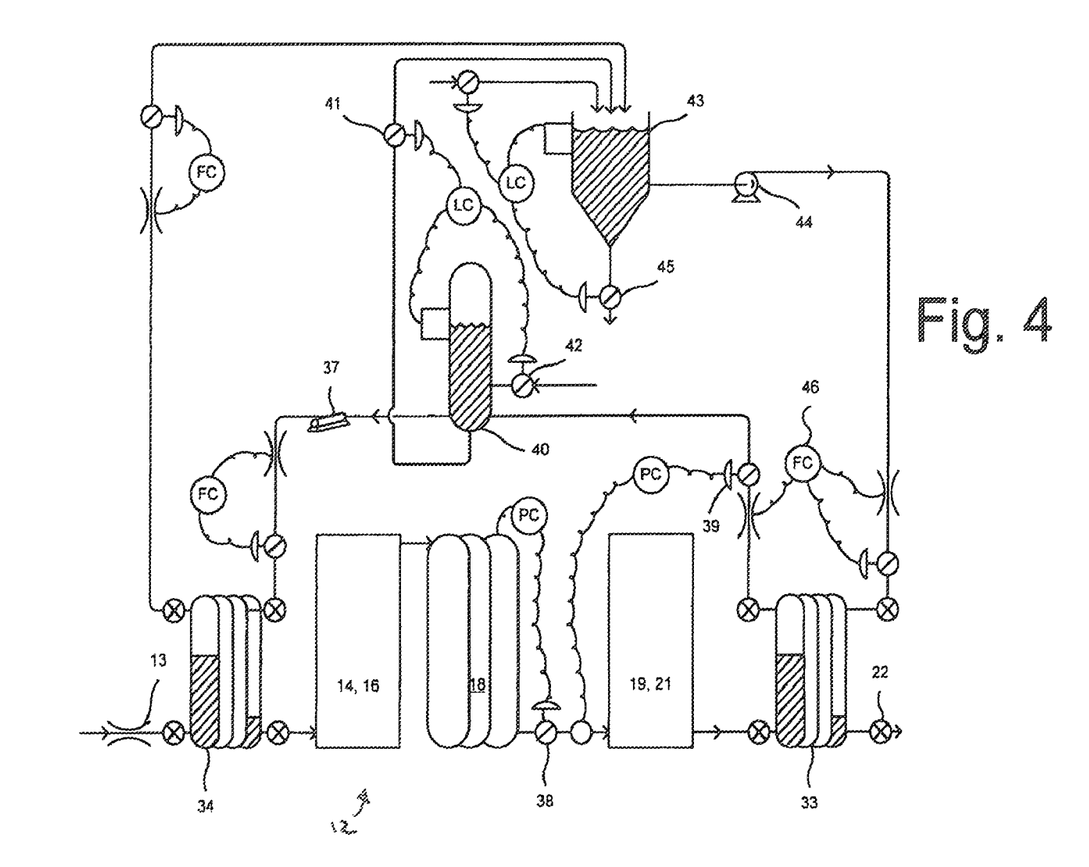
FIG. 4 is a flow diagram of the pumping, heating and cooling process of the present invention.

The method and heat exchange system 12 shown in FIGS. 2 and 4 is a significant improvement over conventional methods and systems for several reasons. A first improvement is that there is no step-wise flash depressurization to cool the slurry, eliminating the many problems associated with the very high velocities of abrasive slurry between flash stages. A second improvement is that there is no flash steam heat interchange allowing a closer approach to autoclave or reactor temperature and therefore a lower usage of boiler steam. A third improvement is that there is no steam side scale or deposits on indirect heat exchangers. Finally, a fourth improvement is that there is no use of direct flash steam injection heat exchangers with all the problems associated with series slurry pumps and level/pressure control equipment.

However, the conventional shell and tube heat exchanger will have certain disadvantages in the slurry heating/cooling system described in FIG. 2. A first disadvantage is that with abrasive slurries, velocity must be kept low to minimize tube wear, especially at the tube sheet entry. A low slurry velocity lowers the heat transfer coefficient, especially with a viscous slurry. A second disadvantage is that with a large number of tubes in the heat exchanger, there will be no positive control of slurry through each tube. When a tube becomes partly restricted due to scale or deposition of coarse solids, velocity in the tube decreases resulting in more deposits and further restriction. Such occurrences decrease the heat transfer capability of the heat exchanger and make subsequent cleaning more difficult.

Because of the above disadvantages of the shell and tube heat exchanger, the tube-in-tube heat exchanger will be the preferred choice to use in the heating/cooling method and system 12 described by FIG. 2. It has only a few tubes compared to the many small tubes in a conventional shell and tube heat exchanger in similar service. For example, the shell and tube heat exchanger may have 80 to 120 tubes, while a tube-in-tube heat exchanger has between 1 and 10 tubes. Most preferably, the tube-in-tube heat exchanger has three to seven tubes.

The tube-in-tube heat exchanger has the following advantages over the conventional shell and tube exchanger in this service:

Larger tube diameter. Preferably, the tube diameter of the tube-in-tube heat exchanger is 75 mm to 150 mm, while the tube diameter in a conventional shell and tube heat exchanger is 25 mm to 50 mm. The larger tubes are less prone to plugging by coarse solids and are easier to clean.

More positive control of the slurry in each tube because there are only a few tubes versus many tubes. This feature avoids plugging or part plugging of tubes from slurry deposits.

Long runs of straight tubes or pipe (90 m or more) allow higher velocities without excessive abrasive wear of tubes. Tube wear in a shell and tube exchanger occur mostly at the many tube sheet entry points. By contrast, the simple tube-in-tube heat exchanger has no tube sheet. The higher velocity results in a higher overall heat transfer coefficient. However, in order to minimize abrasive wear on impinged surfaces, the slurry velocity is kept below 5 meters per second.

If a particular slurry tends to form scale or deposits in the tube, the higher velocities will significantly reduce their rate of formation, particularly if the slurry is somewhat abrasive. This feature results in higher overall heat transfer coefficient and longer operating time between cleanings.

In summary, the advantages of this method of heating and cooling a slurry and employing tube-in-tube heat exchangers are:

1) No shell side fouling of heat exchangers.

2) No flash vessel in the cooling system (avoiding the many operating, maintenance and availability problems typically associated with flash cooling a slurry).

3) No flash steam heat interchange allows a closer approach to autoclave or reactor temperature (i.e. more efficient recuperative heating) and a lower usage rate of live steam (less Powerhouse steam).

2). Slurry Pumping

The heat exchange system 12 shown in FIG. 2 will cool slurry 13, but with a very high pressure at the discharge end of the heat exchanger 21, perhaps 20 to 30 atm. The pressure drop to atmospheric pressure would be extremely demanding of a slurry pressure control valve, resulting in a short life and wasted energy. To overcome this problem, a novel application of membrane pumps, piston pumps, or float-type pumps is stipulated. Preferably, float-type pumps are used.

Figure 3:
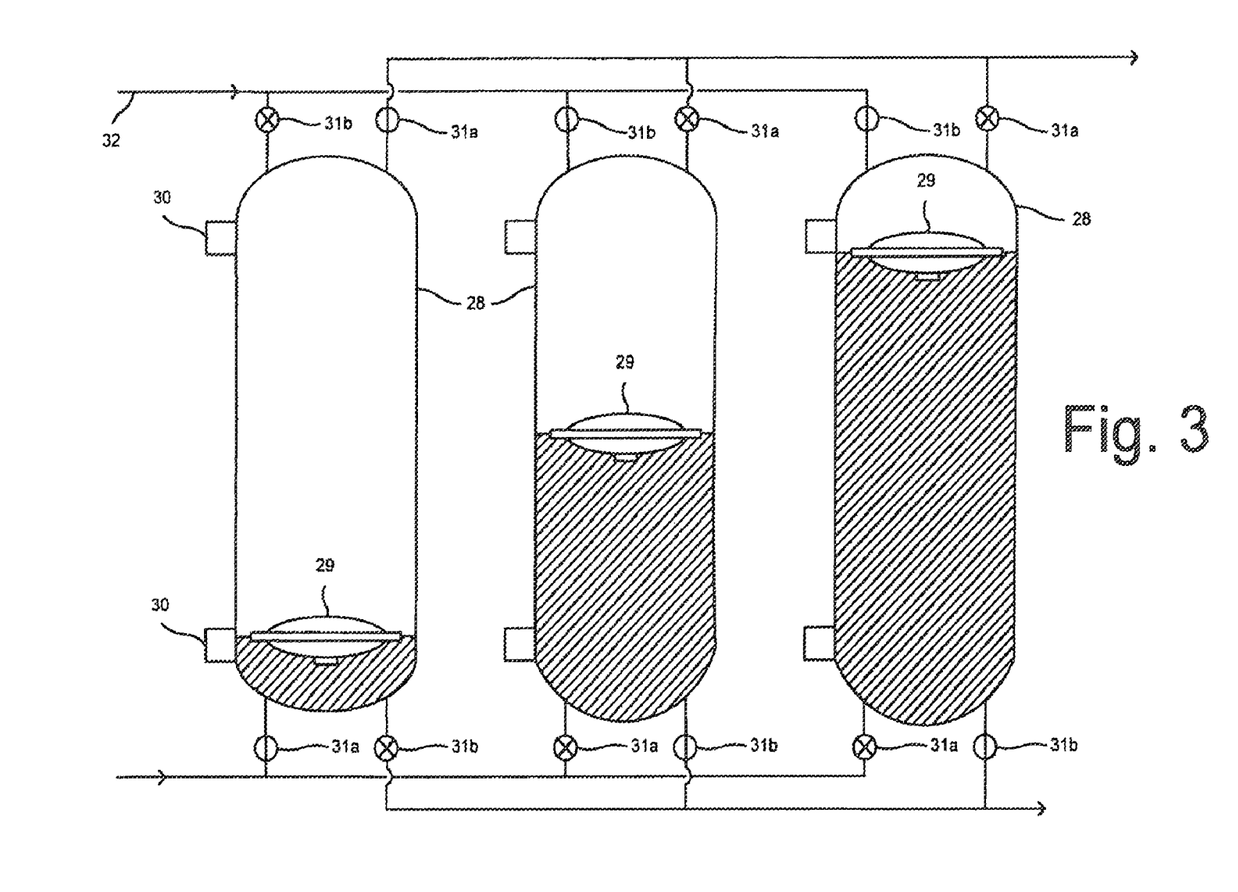
FIG. 3 is a flow diagram of the float-type pump used in the present invention.

A brief description of a float-type pump will provide the basis for understanding the novelty of the application. A float-type pump is a positive displacement pump that is capable of providing a continuous even flow of a thick slurry at elevated discharge pressure. Such pumps have been used successfully in other applications for many years. As shown in FIG. 3, the pump consists of three (or more) vertical cylinders 28 with a float 29 in each cylinder 28. The overall density of the float 29 is lower than the density of the slurry being pumped and higher than the density of a driver liquid 32 (typically water) above the slurry. Proximity sensors 30 on each cylinder 28 recognize the high and low levels of the float 29 and thereby the high and low levels of the slurry. Driver liquid 32 above the float 29 is discharged as the cylinder is filled with slurry.

When the cylinder 28 is full of slurry, the proximity sensor 30 signal activates a first set of valves 31a to switch from an open position to a closed position and a second set of valves 31b to switch from a closed position to an open position. This action opens the second set of valves 31b to the high pressure driver liquid 32 which forces slurry from the cylinder. Slurry discharges from the cylinder to the level of the lower proximity sensor 30. Second set of valves 31b close and first set of valves 31a open to restart the cycle. Because of the slow rate of filling and discharge and because the float 29 separates slurry and driver fluid 32, there is only minor leakage of slurry to the driver fluid. With multiple cylinders 28 and a programmed control system, the pump operates smoothly with continuous flow and steady pressure.

The action of the float-type pump can be used in reverse. That is, the slurry, which is at high pressure and super cooled, and is exiting from the discharge end of the cooling water heat exchanger (21 in FIG. 2) can be lowered to near atmospheric pressure without the abrasive wear that would occur in using a pressure control valve.

Referring to FIG. 4, a float-type discharge pump 33 receives slurry 13, which is at elevated pressure and has been cooled. Slurry 13 displaces a driver fluid, such as water, above a float, which is similar to float 29 (shown in FIG. 3). When the cylinder is full of slurry 13 at elevated pressure, a slurry inlet valve closes and a displaced water valve closes. Then, a slurry outlet valve opens. Shortly after the slurry outlet valve opens, and a low pressure water inlet valve opens so that slurry is discharged from the pump at exit 22 at low pressure. Since slurry 13, which enters discharge pump 33 supercooled and at elevated pressure, has been trapped momentarily in the cylinders of float-type discharge pump 33, the pressure is released on opening the slurry discharge valve without flow or explosive action. Slurry 13, which as been cooled, is discharged from float-type discharge pump 33 at a flow rate set by the low pressure water flow control system 46. The high pressure water displaced by slurry 13 entering float-type discharge pump 33 at high pressure returns to the drive pump 37. The drive pump 37 raises the water pressure to the pressure required to drive slurry 13 from feed pump 34.

In this manner, slurry 13 including abrasive solids is raised to elevated pressure by the feed pump 34 and discharged at low pressure by the float-type discharge pump 33 without high localized pressure drop across piping and control valves in the heating/cooling system. In addition, the pressure energy in slurry 13 entering the float-type discharge pump 33 is recovered in the water displaced by the high pressure of slurry 13 and is then utilized in recycling the water through the drive pump 37 and into the feed pump 34 to drive slurry 13 through heat exchange system 12, including the heat exchangers 14, 16, 19 and 21 and autoclave 18 (shown in more detail in FIG. 2). Thus, the source of the drive liquid for the feed pump 34 is the driven discharge liquid for the float-type discharge pump 33.

The novel application of the float-type pump is an important feature in the invention because it makes the heat exchange system 12 illustrated in FIG. 2 operationally practical.

FIG. 4 illustrates the unique combination of the heat exchange system 12 (shown in detail in FIG. 2) and the float-type pumps 33, 34 as a functional and controllable design for heating slurry 13, which is thick and abrasive, to elevated temperature (about 240° C. and higher) and pressure (about 50 atm) followed by depressurizing and cooling slurry 13 to atmospheric conditions without the use of flash tanks 6 (FIG. 1) and without a high rate of wear of pipes, control valves, etc. The solids concentration in the slurry 13 is about 25% to 50%.

Referring to FIG. 4, a controlled flow of slurry 13 enters the float-type feed pump 34, described in more detail in FIG. 3. The feed pump 34 pumps the slurry at elevated pressure through the heat exchange system 12, which includes heat exchangers 14, 16, 19, 21 and autoclave 18. Note, heat exchange system 12 is shown in more detail in FIG. 2. In order to maintain a pressure above the boiling pressure in the autoclave 18, a back pressure control valve 38 is provided and designed for a small pressure drop (about 30 psi or less) in normal operation. A pressure control valve 39 is placed on the high pressure water discharge from the discharge pump 33 to control the pressure above the boiling pressure of the slurry near the entrance to the cooling heat exchanger 19.

The water pressure downstream of pressure control valve 39 would be near the pressure in the autoclave 18 minus the friction pressure drop through the cooling heat exchangers 19 and 21 and control valves 38 and 39. Thus, there would be perhaps 20-30 atm of pressure recovery for a 40-50 atm autoclave operating pressure.

The slurry flowrate at the discharge pump 33 would be close to the slurry flowrate at the feed pump 34, unless another stream (or streams) is added to the autoclave 18 or elsewhere, such as sulfuric acid 17, as shown in FIG. 2. Under the condition that a separate stream is added, the flow control system described above will function properly with the addition of two vessels in the drive water system, as described below. In the case where there is a higher slurry flowrate at the discharge pump 33 than there is at the feed pump 34 (because of a stream added to the autoclave 18 for instance), the discharge pump 33 high pressure water flow-rate will be greater than the feed pump 34 drive water flow rate. For this situation, an accumulator vessel 40 is provided.

The accumulator vessel water level is controlled by control valve 41 to discharge excess water from the drive fluid system. Control valve 42 is provided to add elevated pressure water to the accumulator vessel 40 in case of a deficiency of water in the system.

An atmospheric pressure surge tank 43 is the source of water to displace slurry from the discharge pump 33 through a low pressure pump 44. A blowdown 45 is provided from the surge tank 43 to discharge any excess water from the system and to occasionally purge any solids accumulated in the water system that may occur because of slurry solids leaking across the floats in feed pump 34 and discharge pump 33.

Excess high pressure water in the accumulator vessel 40, because of a separate stream added to the autoclave 18 for instance, could be utilized as drive fluid for a separate float-type pump used to elevate the pressure of the separate stream to autoclave 18 pressure. This would avoid the energy loss that would otherwise occur across control valve 41.

The advantages of the Slurry Pumping System described are:
- There are no high velocities or large pressure drops to cause excessive wear in the float-type pumps.
- There are no large pressure drops across any of the slurry control valves in the heating and cooling system.
- The energy needed to move slurry through the system and up to autoclave or reactor pressure will be equivalent to the friction pressure loss in the piping and control valves only.

The design described for heating, cooling, and pumping a slurry to elevated temperatures and pressures has many advantages, including: elimination of shell side fouling of heat exchangers, elimination of flash cooling of abrasive slurries, reduction in usage of live steam and size of boilers, elimination of abrasive wear of pumps, pipes and control valves, reduction of pumping energy, and probably most important, an improvement in reliability over the conventional hydrometallurgical process. The design described herein could be used in any hydrometallurgical process, such as a PAL process, recovery of gold from refractory gold ore, or recovery of zinc from zinc concentrates.

While the invention has been described by reference to the preferred embodiments described above those skilled in the art will recognize that the invention as described and illustrated can be modified in arrangement and detail without departing from the scope of the invention.

What is claimed is:

1. A method for treating a slurry, comprising:
increasing a first pressure of the slurry to a second pressure with a first float-type pump to form a second pressure slurry;
then increasing a first temperature of the second pressure slurry to a second temperature to form a second pressure, second temperature slurry in a first heat exchanger with a first heat transfer medium that is different than fluid in the second pressure, second temperature slurry;
then changing the second temperature of the second pressure, second temperature slurry to a third temperature to form a second pressure, third temperature slurry;
then decreasing the third temperature of the second pressure, third temperature slurry to a fourth temperature to form a second pressure, fourth temperature slurry in a second heat exchanger with the first heat transfer medium;
then decreasing the second pressure of the second pressure, fourth temperature slurry to a third pressure to form a third pressure, fourth temperature slurry with a second float-type pump; and
discharging the third pressure, fourth temperature slurry.

2. The method according to claim 1, wherein the step of changing the second temperature to the third temperature comprises feeding the second pressure, second temperature slurry that has already been heated by the first heat exchanger to at least one autoclave.

3. The method according to claim 1, wherein the first heat exchanger and the second heat exchanger are tube-in-tube heat exchangers.

4. The method according to claim 2, wherein a fluid stream is added to the at least one autoclave.

5. The method according to claim 1, wherein the first heat transfer medium is substantially comprised of water.

6. The method according to claim 4, wherein the fluid stream is sulfuric acid.

7. A method for treating a slurry, comprising:
feeding the slurry through a first float-type pump to increase a first pressure to a second pressure to form a second pressure slurry;
then feeding the second pressure slurry at a first temperature, to a first heat exchanger to increase the first temperature to a second temperature, to form a second pressure, second temperature slurry, wherein the first heat exchanger uses a first heat transfer medium;
then feeding the second pressure, second temperature slurry that has been heated by the first heat exchanger to at least one autoclave to change the second temperature to a third temperature to form a second pressure, third temperature slurry;
then feeding the second pressure, third temperature slurry to a second heat exchanger to decrease the third temperature to a fourth temperature, to form a second pressure, third temperature slurry, wherein the second heat exchanger uses the first heat transfer medium;
then feeding the second pressure, third temperature slurry through a second float-type pump to decrease the second a pressure to a third pressure to form a third pressure, third temperature slurry; and discharging the third pressure, third temperature slurry.

8. The method according to claim 7, wherein the first float-type pump and the second float-type pump are connected to a drive fluid system.

9. The method according to claim 8, wherein the drive fluid system comprises an accumulator vessel and a surge tank.

10. The method according to claim 9, wherein the accumulator vessel comprises:
a first control valve to discharge excess drive fluid from the drive fluid system; and
a second control valve to add drive fluid to the drive fluid system.

11. The method according to claim 7, wherein the first heat exchanger process comprises at least one tube-in-tube heat exchanger.

12. The method according to claim 7, wherein the second heat exchanger process comprises at least one tube-in-tube heat exchanger.

13. The method according to claim 7, wherein the first heat transfer medium is substantially comprised of water.

14. A method for treating a slurry, comprising:
providing a first heat exchanger having a tube side and a shell side;
providing a second heat exchanger having a tube side and a shell side;
increasing a first pressure of the slurry to a second pressure with a first float-type pump to form a second pressure slurry;
then directing the second pressure slurry into the tube side of the first heat exchanger to increase a first temperature of the second pressure slurry to a second temperature to form a second pressure, second temperature slurry with a first heat transfer medium within the shell side of the first heat exchanger;

then changing the second temperature of the second pressure, second temperature slurry to a third temperature to form a second pressure, third temperature slurry;

then directing the second pressure, third temperature slurry into the tube side of the second heat exchanger to decrease the third temperature of the slurry to a fourth temperature to form a second pressure, fourth temperature slurry with the first heat transfer medium from the first heat exchanger within the shell side of the second heat exchanger;

then decreasing the second pressure of the slurry to a third pressure to form a third pressure, fourth temperature slurry with a second float-type pump; and discharging the third pressure, fourth temperature slurry.

15. The method of claim 14, further comprising changing the fourth temperature of the second pressure, fourth temperature slurry to a fifth temperature to form a second pressure, fifth temperature slurry prior to decreasing the second a third pressure of the slurry to a third fourth pressure.

16. The method of claim 14, wherein using a first heat transfer medium within the shell side of the first heat exchanger includes using heated first heat transfer medium from the second heat exchanger, and wherein a direction of the flow of the first heat transfer medium opposes a direction of a flow of the second pressure, second temperature slurry.

17. The method of claim 16, wherein using the first heat transfer medium within the shell side of the second heat exchanger includes using cooled first heat transfer medium from the first heat exchanger, and wherein a direction of the flow of the first heat transfer medium opposes a direction of a flow of the second pressure, second temperature slurry.

* * * * *